US007308611B2

(12) United States Patent  
Booth

(10) Patent No.: US 7,308,611 B2
(45) Date of Patent: Dec. 11, 2007

(54) INTELLIGENT POWER CYCLING OF A WIRELESS MODEM

(75) Inventor: Stephen Craig Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 593 days.

(21) Appl. No.: 10/268,674

(22) Filed: Oct. 11, 2002

(65) Prior Publication Data

US 2004/0073847 A1  Apr. 15, 2004

(51) Int. Cl.
    *G06F 11/00* (2006.01)
(52) U.S. Cl. ............................ 714/40; 714/47; 714/48; 710/19; 455/115.1
(58) Field of Classification Search ................ 455/572, 455/115.1; 714/14, 40, 43, 44, 47, 48; 710/15, 710/19
    See application file for complete search history.

(56) References Cited

U.S. PATENT DOCUMENTS

| | | | | |
|---|---|---|---|---|
| 4,545,011 A | * | 10/1985 | Lyon et al. .................... | 714/43 |
| 5,008,902 A | * | 4/1991 | Key et al. .................... | 375/225 |
| 5,241,402 A | * | 8/1993 | Aboujaoude et al. ....... | 358/406 |
| 5,612,961 A | * | 3/1997 | Cabezas et al. ............. | 714/715 |
| 5,883,901 A | * | 3/1999 | Chiu et al. ................... | 370/508 |
| 6,078,645 A | * | 6/2000 | Cai et al. ........................ | 379/3 |
| 6,308,286 B1 | * | 10/2001 | Richmond et al. ............ | 714/13 |
| 6,330,278 B1 | * | 12/2001 | Masters et al. ............. | 375/223 |
| 6,330,597 B2 | * | 12/2001 | Collin et al. ................ | 709/220 |
| 6,487,618 B1 | * | 11/2002 | Theron et al. .............. | 710/105 |
| 6,628,705 B1 | * | 9/2003 | Kuriyan ....................... | 375/220 |
| 6,662,135 B1 | * | 12/2003 | Burns et al. ................ | 702/120 |
| 6,834,077 B1 | * | 12/2004 | Woude ........................ | 375/222 |
| 2002/0057206 A1 | * | 5/2002 | Reynolds .................... | 340/825 |
| 2003/0065830 A1 | * | 4/2003 | Tung et al. .................... | 710/8 |
| 2006/0174171 A1 | * | 8/2006 | Betts et al. ................. | 714/712 |

FOREIGN PATENT DOCUMENTS

GB  2358114 A * 7/2001
SE  9503743 A * 4/1997

OTHER PUBLICATIONS

Stride, Scot; Microrover Radio Modem, Oct. 3, 1997, Jet Propulsion Laboraties, California Institute of Technology and NASA, p. 1-7, http://mars.sgi.com/rovercom/radiot.html.*
UART definitions, Google, retrieved from the Internet [May 12, 2006]:<URL: http://www.google.com> search term "define:UART".*

* cited by examiner

*Primary Examiner*—Scott Baderman
*Assistant Examiner*—Paul F Contino

(57) ABSTRACT

A system for initiating a connection to a wireless network using a wireless modem, where the system maintains the connection to the wireless network when the wireless modem becomes idle. The system determines that there is a problem using the wireless modem by monitoring the status of the wireless modem. In response to a determination that there is a problem using the wireless modem, the system automatically cycles power to the wireless modem and again initiates a connection to the wireless network using the wireless modem. The system may be implemented by an apparatus having a power control device with a power outlet coupled to a wireless modem. The control device controls power to the power outlet according to received power control commands that are based on the status of the wireless modem.

8 Claims, 4 Drawing Sheets

INTELLIGENT POWER CYCLING OF A WIRELESS MODEM

BACKGROUND OF THE INVENTION

1. Field of the Invention

The present invention is directed to intelligently cycling power to a wireless modem in accordance with operating conditions or observations of the wireless modem.

2. Description of the Related Art

Wireless modems may be thought of as simplified cell phones, or cell phones without a user interface. A wireless modem is a component of a cell phone, but also can and does exist independently of a cell phone. Firmware written for wireless modems that allows external entities (such as computer software) to control the modems is not robust and is prone to failures that can cause the modems to become unresponsive to commands. A wireless modem's connection to a wireless infrastructure often breaks down (e.g., "drop-outs", lost connections, etc.). When this happens, a wireless modem's firmware can malfunction, rendering the modem unresponsive. Wireless modems often are released with minimal testing, and the firmware problems are not fixed. Because of the firmware problems, wireless modems that are continuously powered are prone to become non-responsive.

These wireless modem problems have limited how they are used, particularly for testing a wireless modem's wireless network. To avoid instability, wireless modems have been supplied with power on a per-test basis. Typically, power to a wireless modem is supplied to the modem for the duration of a test. For example, when testing wireless communication through a wireless modem, a discrete network test will begin with powering on the wireless modem. The test will be conducted and the modem will be powered off when the test is complete. Extended-use instability has prevented extended-use wireless testing, and modems have not been kept connected or powered on between tests.

What is needed is a system for increasing the availability and usability of a wireless modem by observing or monitoring the state of the wireless modem and cycling power to the modem as necessary, based on the observing or monitoring.

SUMMARY OF THE INVENTION

It is an aspect of the present invention to provide a system for controlling supply of power to a wireless modem based on the operability of the wireless modem.

It is another aspect of the present invention to provide a system cycling power to a wireless modem when attempts to communicate with the wireless modem have failed.

It is yet another aspect of the present invention to cycle power to a wireless modem when attempts to establish communication with the wireless modem have failed.

It is still another aspect of the present invention to cycle power to a wireless modem when the wireless modem cannot sustain or obtain a baud rate.

It is another aspect of the present invention to provide a system cycling power to a wireless modem when a communication path or link using the modem has failed.

It is another aspect of the present invention to provide a system cycling power to a wireless modem when the wireless modem supplies an application with erroneous or unexpected data.

It is another aspect of the present invention to provide a system cycling power to a wireless modem based on errors of an operating system that is providing application access to the wireless modem.

The above aspects can be attained by a system that monitors the status of a wireless modem and in response to a determination that the wireless modem is not functioning properly, the system automatically cycles power to the wireless modem. The system can be implemented with any arrangement by which a computer can automatically control the supply of power to a wireless modem.

More specifically, the above aspects can be obtained by a system that initiates a connection to a wireless network using a wireless modem, where the system maintains the connection to the wireless network even when the wireless modem becomes idle. The system determines that there is a problem using the wireless modem by passively or actively monitoring the status of the wireless modem. In response to a determination that there is a problem using the wireless modem, the system automatically cycles power to the wireless modem and again initiates a connection to the wireless network using the wireless modem.

The system may also be implemented by an apparatus having a power control device with a power outlet and a first communication interface receiving power control commands. The control device controls power to the power outlet according to the received power control commands. A wireless modem is coupled to the power control device. A controlling device has a second communication interface through which the controlling device monitors the status of the wireless modem device. The controlling device also has a third communication interface through which the controlling device sends power control commands to the power control device.

There are many possible bases for determining that there is a problem with the wireless modem under test, including, for example, failures to connect to the modem's wireless network, failures to read or write to the modem, unexpected or erroneous data read from the modem, etc.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
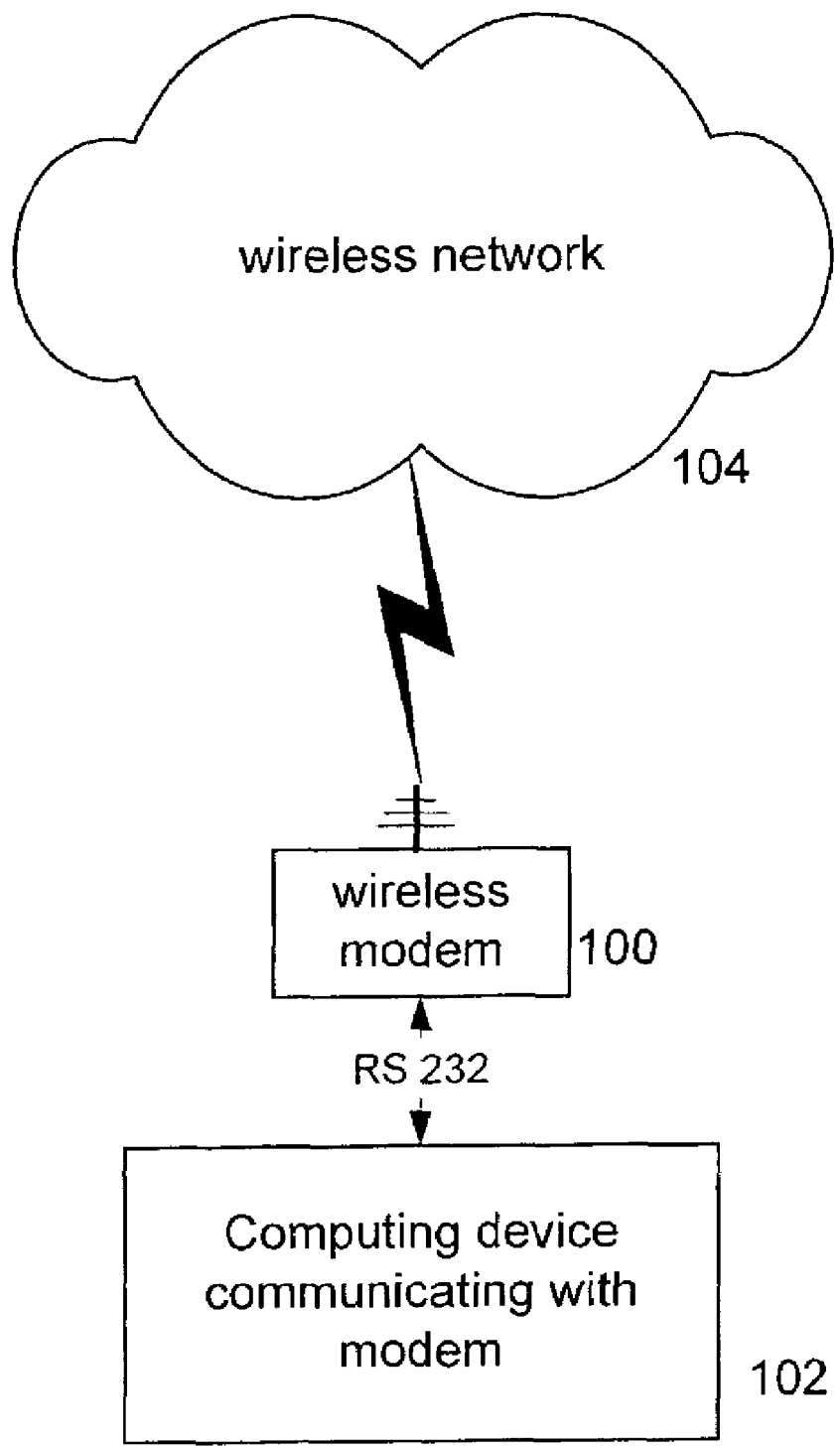
FIG. 1 shows a wireless network testing system.

Wireless networks benefit from automated testing. FIG. 1 shows a wireless network testing system. A wireless modem 100 is controlled and used over an RS 232 line by a computing device 102, which uses the wireless modem 100 to communicate with or across a wireless network 104. Typically, the computing device 102 has an operating system, which provides an application programming interface (API) serving as a control layer through which the computing device 102 controls and accesses the wireless modem 100. In one embodiment, the computing device 102 conducts various tests relating to the network 104. Such a wireless network testing system may actively or passively monitor and test the wireless network, possibly at different network layers or levels.

Figure 2:
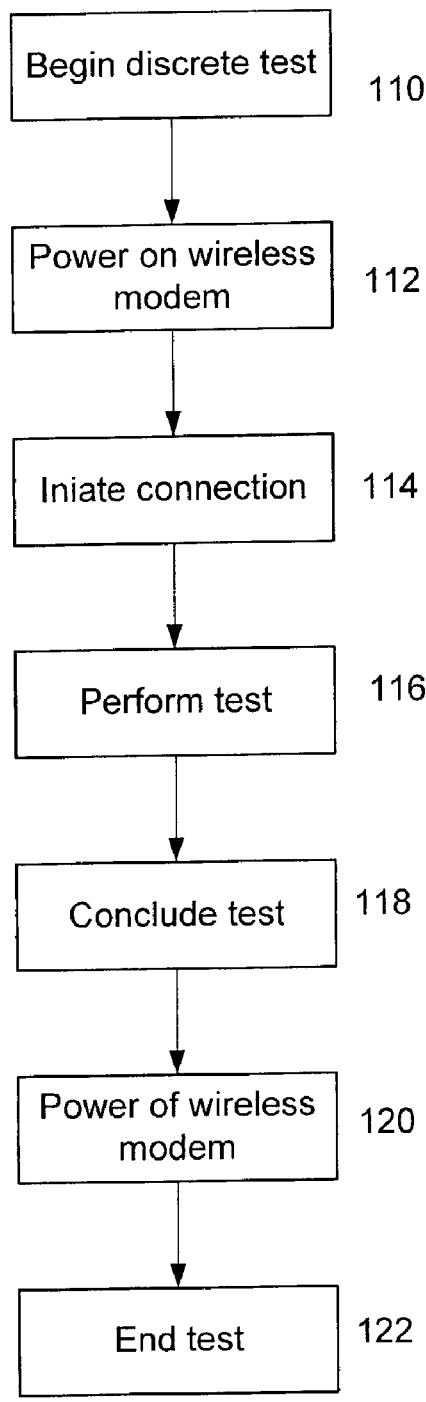
FIG. 2 shows a typical use of power cycling.

A wireless network testing system uses wireless modems to communicate over the wireless network. However, wireless modems—in effect simplified cell phones—are inherently unstable. This instability has discouraged extended testing and has led to the design of testing systems with hardwired or unconditional power cycling. FIG. 2 shows a typical use of power cycling. When a discrete test begins 110, a wireless modem is powered on 112, a connection is initiated 114, a test is performed 116 and concluded 118, and then the wireless modem is powered off 120.

Extended use of wireless modems (extended testing, for example) with continuously connected or powered modems has not previously been performed. To avoid the likelihood of modem failure, wireless modems have been powered on only for a short time, and then powered off when no longer needed. Previously, modem failures have been manually corrected by manually cycling power (turning the wireless modem off and on, and removing the modem's battery pack, if it has one, for several seconds).

Figure 3:
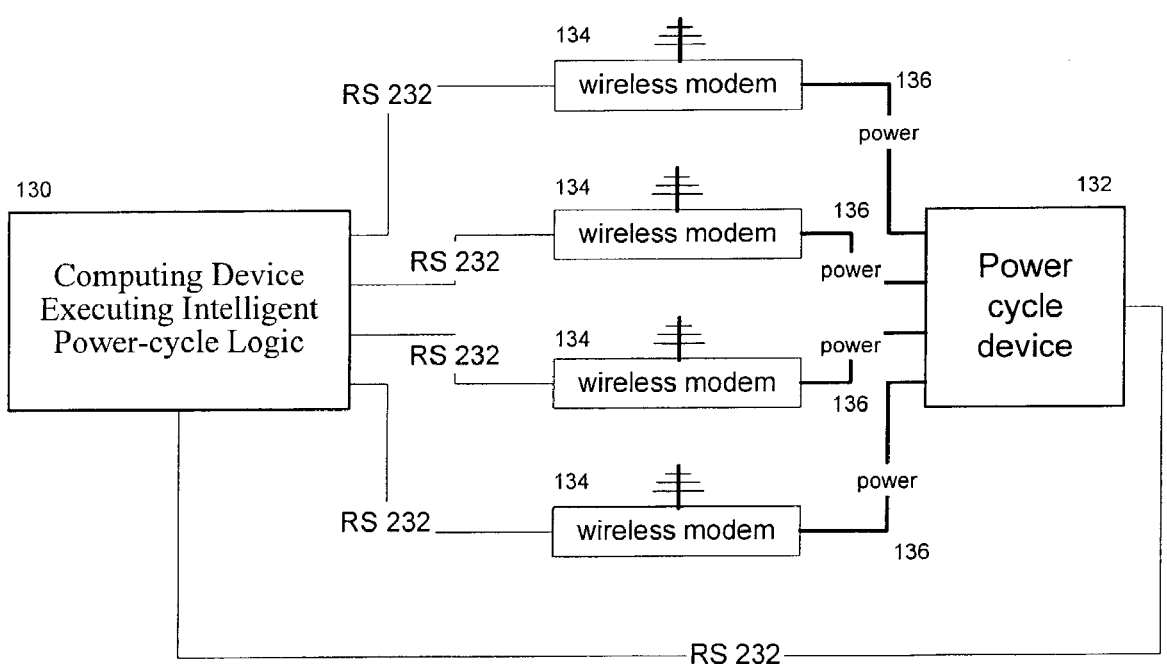
FIG. 3 shows a testing system arrangement.

FIG. 3 shows a testing system arrangement. A computing device 130 communicates over an RS 232 line with a power cycle device 132. The computing device 130 also communicates over RS 232 lines with one or more wireless modems 134. The power cycle device 132 supplies power to the wireless modems 134 over power lines 136. A Siemens MC35T wireless modem can serve as a wireless modem 134. A Western Telematic Inc. power switching device, for example an RBP+115 power switch, can serve as the power cycle device 132. Serial line communication is not required; any form of computer-to-device communication may be used.

The power cycle device 132 generally will have one or more power sockets or outlets (not shown), through which it switchably supplies power. The supply of power at a socket or outlet may be individually turned on or turned off by the power cycle device 132. The power to a socket is switched or controlled by the power cycle device 132 in accordance with commands or control signals received by the power cycle device 132 over a communication interface, such as an RS 232 interface connected to the RS 232 link. The commands or control signals may be issued from a controlling device, such as computing device 130. Typical commands are "turn power on", and "turn power off", and also perhaps "cycle power" (turn power off and back on).

Figure 4:
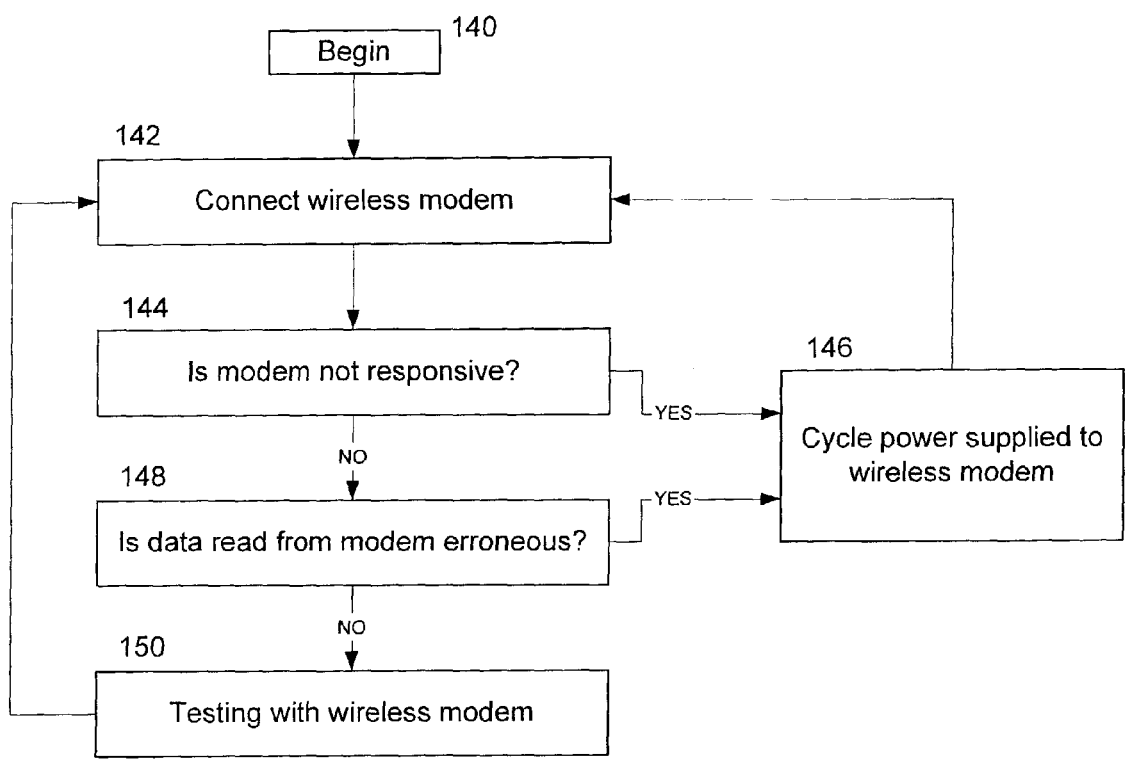
FIG. 4 shows a process for power cycling a wireless modem.

FIG. 4 shows a process for power cycling a wireless modem 134. The process in FIG. 4 is preferably executed by a computer program or application running on computing device 130. The process begins 140 with the program connecting 142 a wireless modem 134. The connecting 142 is usually handled through the operating system, which allocates resources necessary for the application to communicate with the wireless modem 134. If the modem 134 is not responsive 144, then power is cycled 146 to the wireless modem 134. The power cycling 146 is performed by the power cycle device 132 in response to a power cycle instruction (command or signal) issued by the computing device 130. The power cycle device 132 cycles power to the wireless modem 134 by cutting and restoring power to the power outlet of the power cycle device 132 to which the wireless modem 134 is connected. This cycling of the power supplied by the power outlet naturally cycles the power of the connected wireless modem 134.

Typically, the wireless modem 134 is determined or deemed to be non-responsive 144 based on error codes returned from calls to an operating system resource associated with the wireless modem 134, or by failure of the wireless modem to respond to such calls. For example, an operating system resource such as a port is opened for accessing the wireless modem 134. If a system call to read from or write to the port associated with the wireless modem 134 returns an error code that is in a designated set of error codes, then the modem is deemed not responsive 144 and the modem is power cycled 146. If Microsoft Windows/2000® is the operating system, exemplary error codes are error numbers 777 and 797.

A specified number of failed attempts to communicate with the modem 134 may be used as a basis for determining that the wireless modem 134 is non-responsive 144. Even if the application (or operating system) is able to communicate with the modem 134, the modem 134 may not be able to establish communication with a target device on or across the wireless network. A number of such failures may also indicate a non-responsive 144 modem 134. Failure to achieve or sustain a required or specific baud rate may also indicate an erroneous or non-responsive 144 wireless modem 134.

It is also possible that the wireless modem 134 may positively respond to system requests and yet be in a corrupt state 148. That is to say, a call to read from a port assigned to the wireless modem 134 may return a code indicating a successful read of data from the modem 134, yet the wireless 134 modem may be in an error state of the type that causes it to corrupt or incorrectly supply the data it is receiving from the wireless network. For example, the wireless modem 134 may have begun incorrectly decoding or otherwise processing received data. Therefore, even if the wireless modem 134 is not deemed to be non-responsive 144, it is preferable to check the data or content being read from the wireless modem 134. Various tests may be used to identify corrupt content 148, including, for example, comparing the data to a checksum, determining if the data has unusual or unexpected patterns such as long strings of null (0), comparing the data to expected formats or protocol layouts (e.g. a number is expected but not found in a particular position of read data), determining if an expected amount of data was read, etc. If it is determined that data read from the responsive (but possibly unstable) wireless modem 134 is corrupt or erroneous 148, then the wireless modem 134 is power cycled 146.

In general, any condition that may indicate a problem with a wireless modem may be used as a basis for resetting or power cycling the wireless modem. Other examples are unusually fast or slow response times. Furthermore, although active test conditions have been described, passive test conditions may also be used. For example, error interrupts may be generated by the operating system or by communication software used to communicate with the wireless modem 134.

Regardless of what conditions are used to indicate a problem with a wireless modem, the present invention may be said to intelligently cycle power to wireless modems; cycling depends on conditions as they occur rather than unconditionally. This allows a wireless modem to be treated as though it were any other stable network device or interface. Other than power cycling, no special treatment is generally necessary for a properly functioning wireless modem.

If a wireless modem enters an error state or begins to function improperly, then in response the wireless modem may be power cycled. This allows the wireless modem to be used for extended connectivity, rather than being powered on only when active use is required. Accordingly, it is possible to derive additional test information about the modem's wireless network. For example, it is possible to measure how long a connection lasts before failure. It also is possible to run a standard set of tests without constantly manually intervening. Previously, a wireless modem could not be left powered on because extended use was likely to result in a failure of the modem. However, with the present invention, although wireless modem failures are still possible, because they can be automatically detected and corrected, extended continuous modem connectivity or use becomes possible.

With external wireless modems, a power cycle device 132 is preferred because external wireless modems can be powered (or de-powered) by their own AC power supply (e.g. an AC adapter). Cutting off the AC power source cuts off power to the wireless modem. However, in the case of an internal or USB wireless modem, the computer itself may supply or control power to the modem. With such modems, the power cycle device is not used. Rather, the computer using the wireless modem applies the same or similar intelligent power cycling logic discussed above, and rather than cycling the modem's power with a separate power cycle device 132 the computer itself can directly cycle power to the wireless modem. For example, a computer communicating with a wireless modem through a USB could cycle the USB power, thus cycling the wireless modem device. Some laptops power off their USB when they switch to battery power. If switching to battery power can be controlled by an application, then an application can cycle its modem by temporarily switching to battery power and then back to line power. Modems using USB power control switches may have their power cut by way of a power control switch. In sum, any method by which a computer can control the supply of power to a wireless modem may be used.

Finally, the present invention is not limited to wireless network testing. In general, any use of a wireless modem can be improved by intelligently cycling its power. Some wireless modems are designed to perform a soft reset when so commanded. However, unstable wireless modems often lockup and therefore cannot respond to a reset command. Power cycling allows these modems to be intelligently and automatically reset.

The present invention has been described with respect to a system and method for intelligently power cycling wireless modems. The invention can apply not only to wireless modems, but also to any powered modem or device with which we can be interacted with in a meaningful way to assess its operational state. Standard V.90 modems have also been used. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of power cycling a wireless modem, comprising:
   testing the wireless modem continuously for error conditions while the wireless modem is connected to a wireless network, the testing comprising:
   determining if the wireless modem is non-responsive to attempts at communication with the wireless modem, and
   determining if data received by the wireless modem is erroneous using at least one of the following corruption identification techniques: calculating a checksum on the received data, determining if the received data has unexpected patterns, determining whether the received data follows expected formats or protocols, and determining if an amount of received data matches an expected amount; and
   automatically cycling a power source of the wireless modem if the testing determines at least one of the following conditions to be true:
   the modem is non-responsive, and
   the data received by the wireless modem is erroneous.

2. A method of power cycling a wireless modem, comprising:
   determining that the wireless modem is in an error state through continuous testing of the wireless modem while the wireless modem is connected to a wireless network, the error state achieved if at least one of the following conditions are met: the wireless modem is non-responsive to attempts at communication with the wireless modem and data received by the wireless modem is determined as erroneous using at least one of the following corruption identification techniques: calculating a checksum on the received data, determining if the received data has unexpected patterns, determining whether the received data follows expected formats or protocols, and determining if an amount of received data matches an expected amount;
   automatically power cycling the wireless modem if the wireless modem is in the error state.

3. A method of testing a wireless network, comprising:
   automatically sending multiple active tests, multiple passive tests, or both via the wireless network to a wireless modem while initially maintaining power to the wireless modem during the tests;
   determining if the wireless modem is in an error state via the tests, the error state achieved if at least one of the following conditions are met: the wireless modem is non-responsive to attempts at communication with the wireless modem and data received by the wireless modem is determined as erroneous using at least one of the following corruption identification techniques: calculating a checksum on the received data, determining if the received data has unexpected patterns, determining whether the received data follows expected formats or protocols, and determining if an amount of received data matches an expected amount;
   automatically power cycling the wireless modem if it is determined the wireless modem is in the error state; and
   repeating the tests if the wireless modem is not determined to be in an error state.

4. A method according to claim 3, further comprising:
   automatically determining, from attempting to send one of the tests to the wireless modem, that there is a problem with at least one of the wireless modem and the wireless network, and performing the power cycling in response to the determining.

5. A method, comprising:
   initiating a connection to a wireless network using a wireless modem;
   maintaining the connection to the wireless network when the wireless modem becomes idle;

testing the wireless modem continuously for error conditions while the connection is being maintained;

determining that there is a problem using the wireless modem if said testing indicates that there are error conditions, the error conditions including at least one of the following: the wireless modem is non-responsive to attempts at communication with the wireless modem and data received by the wireless modem is determined as erroneous using at least one of the following corruption identification techniques: calculating a checksum on the received data, determining if the received data has unexpected patterns, determining whether the received data follows expected formats or protocols, and determining if an amount of received data matches an expected amount; and in response to a determination that there is a problem using the wireless modem, automatically cycling power to the wireless modem and re-initiating a connection to the wireless network using the wireless modem.

6. An apparatus, comprising:

a wireless modem;

a testing system to test the wireless modem continuously for error conditions while the wireless modem is connected to a wireless network, the testing system comprising:

determining if the wireless modem is non-responsive to attempts at communication with the wireless modem, and determining if received by the wireless modem is erroneous using at least one of the following corruption identification techniques: calculating a checksum on the received data, determining if the received data has unexpected patterns, determining whether the received data follows expected formats or protocols, and determining if an amount of received data matches an expected amount; and a computer communicating with the wireless modem and controlling a source of power for the wireless modem, wherein the computer cycles power to the wireless modem if at least one of the following conditions occurs: it is determined that the wireless modem is non-responsive, and if it is determined that the data received by wireless modem is erroneous.

7. An apparatus, comprising:

a power control device with at least one power outlet and a first communication interface receiving power control commands, the control device controlling power to the power outlet according to the received power control commands;

a wireless modem coupled with the power control device; and a controlling device comprising a second communication interface through which the controlling device monitors a status of the wireless modem device through continuous testing of the wireless modem while the wireless modem is connected to a wireless network; wherein the status of the wireless modem device includes a determination of whether the wireless modem is non-responsive to attempts at communication with the wireless modem, and a determination of whether data received by the wireless modem is erroneous using at least one of the following corruption identification techniques: calculating a checksum on the received data, determining if the received data has unexpected patterns, determining whether the received data follows expected formats or protocols, and determining if an amount of received data matches an expected amount, and a third communication interface through which the controlling device sends power control commands that are based on the status of the wireless modem to the power control device.

8. A computer readable storage for enabling a device to perform a process, the process comprising:

determining that an error condition exists through continuous testing of the wireless modem while the wireless modem is connected to a wireless network, by determining:

if a wireless modem is non-responsive to attempts at communication with the wireless modem, and if received by the wireless modem is in an error state using at least one of the following corruption identification techniques: calculating a checksum on the received data, determining if the received data has unexpected patterns, determining whether the received data follows expected formats or protocols, and determining if an amount of received data matches an expected amount; and in response to the determining, automatically cycling a power source of the wireless modem if one of the following conditions occurs:

it is determined that the wireless modem is non-responsive, and it is determined that the data from the wireless modem is in the error state.

* * * * *

UNITED STATES PATENT AND TRADEMARK OFFICE
CERTIFICATE OF CORRECTION

PATENT NO. : 7,308,611 B2  Page 1 of 1
APPLICATION NO. : 10/268674
DATED : December 11, 2007
INVENTOR(S) : Booth It is certified that error appears in the above-identified patent and that said Letters Patent is hereby corrected as shown below:

On the Title Page, Item (56) under "Other Publications", delete "Laboraties" and insert -- Laboratories --, therefor.

Signed and Sealed this

Twenty-seventh Day of May, 2008

JON W. DUDAS
*Director of the United States Patent and Trademark Office*